United States Patent Office 2,701,230
Patented Feb. 1, 1955

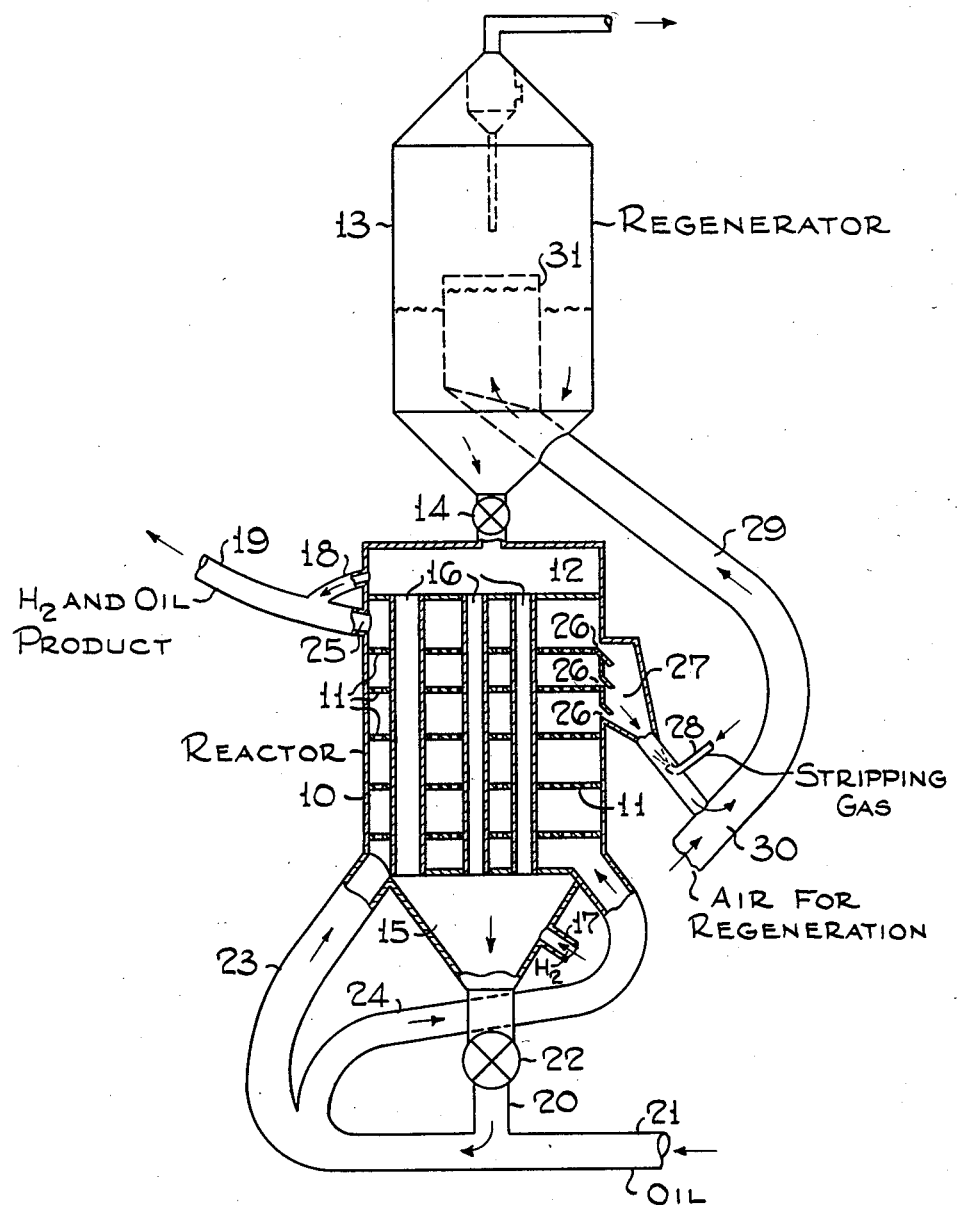

2,701,230

HYDROFORMING PROCESS AND APPARATUS

Forrest H. Blanding, Cranford, N. J., assignor to Standard Oil Development Company, a corporation of Delaware Application July 1, 1949, Serial No. 102,558

5 Claims. (Cl. 196—50)

This invention pertains to a process and apparatus for converting hydrocarbons and particularly to a process and apparatus for hydroforming naphtha fractions by the fluid solids technique.

In the reforming of hydrocarbon materials, particularly naphtha fractions, it has been found advantageous to produce an inverse temperature gradient in the reaction zone. In other words, instead of supplying reactant or reactant and catalyst in the case of fluid operation at a maximum temperature and taking a drop in temperature through the reaction zone because of the endothermic nature of the reaction, it is advantageous to so conduct the process that heat is supplied to the reaction zone so that the temperature of the reaction mixture at the oulet of the reaction zone is equal to or greater than the temperature at the inlet end of the reaction zone. It has previously been proposed to achieve isothermal or inverse temperature gradient operation by introducing preheated hydrocarbon gases containing hydrogen at spaced points in the reaction zone. Addition of heat in this manner is objectionable in fluid solids operations because it substantially increases gas velocities through the equipment increasing entrainment of finely divided catalyst or necessitating substantial increases in size of equipment in order to keep the gas velocity down to a reasonable value. It also requires the handling, storing, compressing, etc. of large quantities of gas.

It is the object of this invention to provide a process and apparatus for the reforming of hydrocarbon materials by the fluid solids technique.

It is also an object of this invention to provide a process and apparatus for hydroforming naphtha fractions by the fluid solids technique with an inverse temperature gradient without burdening the reactor system with large quantities of gaseous heating agents.

A further object of this invention is to provide a process and apparatus for hydroforming naphtha in which substantial thermal degradation of the feed stock is avoided and in which degradation of the catalyst particles in the regeneration and reactivation treatments is avoided.

A further object of this invention is to provide an apparatus for conveniently pretreating the regenerated catalyst at temperatures below the reaction and regeneration temperatures.

These and other objects will appear more clearly from the detailed specification and claims which follow.

This invention is illustrated by the accompanying drawing in which the figure is a schematic vertical section of a reactor system embodying the novel features of this invention.

Referring to the drawing 10 is a reactor vessel which is provided with a plurality of horizontal perforated baffle plates 11 that divide the reactor into several separate sections in which catalyst is retained. Advancement of the catalyst from each plate to the plate next above without back mixing is essential to the attainment of an inverse temperature gradient. The top of the reactor 10 is provided with a chamber 12 for receiving freshly regenerated catalyst from the regenerator 13. A valve 14 is provided in the line connecting the bottom of the regenerator with the top of the reactor vessel for controlling the passage of regenerated catalyst from the regenerator to the reactor.

The catalyst particles pass from the chamber 12 at the top to a chamber 15 at the bottom of the reactor through a plurality of tubes 16. The number and arrangement of the tubes 16 may be varied as desired. Travel of the catalyst through the tubes should be at such a rate as to permit the hot, freshly regenerated catalyst to give up a substantial part of its heat to the dense catalyst beds on the several perforated baffle plates 11. An inlet line 17 is provided for supplying hydrogen or a gas containing hydrogen to the cooled regenerated catalyst in the chamber 15. The hydrogen or hydrogen-containing gas passes upwardly through the tubes 16 countercurrent to the catalyst particles into the chamber 12 whence it is vented through line 18 into outlet line 19 for hydrogen and product vapors.

The hydrogen treated catalyst particles are discharged from chamber 15 through line 20 into oil feed inlet line 21 at a rate controlled by valve 22. Oil feed stock preheated to a temperature below that at which thermal degradation takes place is supplied to the inlet line from a suitable preheater and the mixture of feed stock and catalyst is supplied to the reactor 10. As shown in the drawing, the mixture of feed stock and catalyst is supplied to the reactor through two branches 23 and 24 on the feed inlet line. Other arrangements readily suggest themselves, it only being necessary to obtain substantially uniform distribution of the reaction mixture to the reactor. The reaction mixture passes upwardly through the several perforated baffle plates, the vaporous reaction products being discharged from the reactor at outlet line 19. The two or three uppermost reactor sections are provided with outlets 26 for the discharge of solid catalyst particles from the perforated baffle plates into a stripping section 27. Stripping gas such as hydrogen or an inert gas such as steam or nitrogen is introduced into the stripping section 27 through line 28 to remove vaporous or vaporizable materials that are entrained with or adsorbed upon the catalyst particles. The stripping gas and stripped out vapors are vented into the reactor and pass therefrom in admixture with the stream of reaction products or they may be vented directly into the product outlet line 19 or into suitable cyclone or centrifugal separator means to remove catalyst particles therefrom.

The stripped catalyst particles are discharged from the stripping section 27 into a conduit 29 where they are picked up by a stream of air or regeneration gas introduced at 30 and carried into the regenerator 13 wherein the carbonaceous deposits are burned from the catalyst particles rendering them suitable for recycling in the process. The regenerator can be of any suitable design as long as it permits contact of the catalyst and regeneration gas for a sufficient period to burn off the carbonaceous deposits. As shown, the regenerator comprises an inner cylindrical chamber 31 in which the burning of the carbonaceous deposits is effected, the regenerated catalyst particles overflowing the top of the cylinder fall into the annular passageway surrounding the cylinder and pass thence to the bottom of the regenerator and through valve 14 into the reactor. The regeneration gases pass overhead and may be processed to recover heat therefrom or part of the regeneration gas may be used as gaseous diluent in the reactor system.

Reforming of hydrocarbon feed stocks in accordance with the present invention can be applied with particular advantage to light naphtha fractions, i. e., having a boiling range of up to about 250° F. or heavy naphtha fractions having a boiling range of about 250° F. to about 430° F. Naphtha feed stocks may be preheated to temperatures of up to about 800° F. without undergoing substantial thermal degradation. Reforming is effected at temperatures of about 875 to 1025° F., preferably at a temperature of about 900 to 950° F.

The catalyst may be one comprising an oxide of a metal of groups IV, V and VI of the periodic table, preferably supported on a suitable carrier or spacing agent such as alumina or zinc aluminate spinels. A preferred catalyst is one comprising from 2 to 20 wt. per cent $MoO_2$ or calcium molybdate on activated alumina, or on zinc spinel, or one comprising about 2 to 25 wt. per cent $Cr_2O_3$ on activated alumina. The catalyst is utilized in finely divided form, the major proportion thereof having a diameter of less than 100 microns, preferably from 20 to 80 microns.

The amount of coke deposited upon the catalyst and the regeneration conditions applied are preferably so controlled that the temperature of the catalyst during regeneration does not rise to more than about 1050° F. Cooling of the freshly regenerated catalyst by passage through the tubes 16 in indirect heat exchange with the reaction mixture should be sufficient to lower the temperature of the catalyst to about 850 to 925° F. prior to contact of the regenerated catalyst with the hydrogen-containing reconditioning gas. This is important because of the fact that the reaction between the regenerated catalyst and the hydrogen is exothermic and would tend to raise the temperature of the catalyst to undesirably high levels if the regenerated catalyst particles were contacted with hydrogen at the regeneration temperature.

The treated regenerated catalyst at a temperature of about 875 to 950° F. is combined with the preheated naphtha feed stock in the weight ratio of from about 2 to 5 parts of catalyst per part of feed. The mixture of catalyst and naphtha feed is passed upwardly through the reactor at superficial vapor velocity of from about 0.2 to 2.0 feet per second. The temperature of the reaction mixture entering the reactor is ordinarily between 850 and 925° F. and increases gradually from plate to plate until at the uppermost plate the temperature of the reaction mixture is about 950 to about 1000° F.

The following example is illustrative of the present invention:

Example

A feed stock comprising a petroleum naphtha derived principally from East Texas crude oil and having a boiling range of 200 to 430° F. may be readily reformed in a reactor system as shown in the drawing. The catalyst comprises 10 wt. per cent $MoO_3$ on activated alumina. The regenerator is operated at 1025° F. and the regenerated catalyst in chamber 16 is at substantially the same temperature as that in the regenerator while in zones 15 and 20 the catalyst temperature is about 925° F.

The naphtha feed stock is preheated to 730° F. and hydrogen at the same temperature is combined with the oil vapors so that the mixture contains 50 vol. per cent $H_2$. Catalyst from zone 20 is combined with the naphtha vapor hydrogen feed in sufficient amount to give a catalyst to oil ratio of 3/1 by weight. The mixture of feed vapors and catalyst passing through inlet lines 23 and 24 are at a temperature of 825° F. and at a pressure of 200 p. s. i. g. At the oil vapor outlet 25 and in the upper beds in the reactor the catalyst temperature is about 950° F. Under these conditions, the naphtha feed stock can be reformed from about 50 Research Octane Number to about 98.0, Research Octane Number in a yield of better than 80%.

The foregoing specification contains a limited number of embodiments of the present invention. It will be understood that numerous variations are possible without departing from the scope of the following claims.

What is claimed is:

1. A process for reforming naphtha fractions which comprises preheating a naphtha feed stock and hydrogen to a temperature of up to 800° F., mixing finely divided hydroforming catalyst particles at a temperature of about 875 to 950° F. with the preheated naphtha feed stock and hydrogen, passing the mixture upwardly through a plurality of reaction zones in series, separating reaction products from spent catalyst in the uppermost reaction zone, withdrawing spent catalyst from the reaction zone, burning carbonaceous deposits from the spent catalyst particles to regenerate the catalyst, passing the hot regenerated catalyst particles downwardly through the plurality of reaction zones in indirect heat exchange relation to the reaction mixture in the several reaction zones and countercurrently to the direction of flow of the reaction mixture in order to heat the reaction mixture in the successive reaction zones to progressively higher temperatures and cool the regenerated catalyst, treating the cool regenerated catalyst with hydrogen and then recycling the regenerated catalyst to the lowermost reaction zone.

2. Apparatus for the conversion of hydrocarbons which comprises an outer casing, a plurality of horizontal, perforated baffle plates arranged in vertically spaced relation in said casing, a chamber at the top of said casing and a chamber at the bottom of said casing, a plurality of vertical tubes substantially uniformly distributed over the cross-section of said casing connecting said chambers, an inlet for the introduction of a mixture of hydrocarbons and solid catalyst particles into said casing in the space surrounding said vertical tubes, an outlet for the reaction products above the uppermost perforated baffle plate, an outlet for the withdrawal of catalyst particles from the uppermost perforated baffle plates, an inlet for the supply of catalyst particles to the chamber at the top of the casing and an outlet for the withdrawal of catalyst particles from the chamber at the bottom of said casing and opening into the inlet for hydrocarbons and catalyst.

3. Apparatus for the conversion of hydrocarbons which comprises an outer casing, a plurality of horizontal, perforated baffle plates arranged in vertically spaced relation in said casing, a chamber at the top of said casing and a chamber at the bottom of said casing, a plurality of vertical tubes substantially uniformly distributed over the cross-section of said casing connecting said chambers, an inlet for the introduction of a mixture of hydrocarbons and solid catalyst particles into said casing in the space surrounding said vertical tubes, an outlet for reaction products above the uppermost perforated baffle plate, an outlet for the withdrawal of catalyst particles from the uppermost perforated baffle plates, an inlet for the supply of catalyst particles to the chamber at the top of the casing, an outlet for the withdrawal of catalyst particles from the chamber at the bottom of said casing and opening into the inlet for hydrocarbons and catalyst, an inlet for the supply of gaseous treating agent into the chamber at the bottom of said casing and an outlet in the chamber at the top of said casing for the withdrawal of gaseous treating agent therefrom.

4. The process as defined in claim 1 in which the hydrogen treatment of the regenerated catalyst is effected while the regenerated catalyst is in indirect heat exchange relation to the reaction mixture.

5. The process as defined in claim 1 in which the hydrogen treatment of the regenerated catalyst is effected while the regenerated catalyst is in indirect heat exchange relation to the reaction mixture by passing hydrogen upwardly countercurrent to the descending regenerated catalyst particles.

References Cited in the file of this patent

UNITED STATES PATENTS

| Number | Name | Date |
|---|---|---|
| 1,573,591 | Wellman | Feb. 16, 1926 |
| 2,348,009 | Johnson et al. | May 2, 1944 |
| 2,363,874 | Krebs | Nov. 28, 1944 |
| 2,366,372 | Voorhees | Jan. 2, 1945 |
| 2,412,025 | Zimmerman | Dec. 3, 1946 |
| 2,433,726 | Angell | Dec. 30, 1947 |
| 2,459,836 | Murphree | Jan. 25, 1949 |
| 2,472,844 | Munday et al. | June 14, 1949 |

FOREIGN PATENTS

| 574,892 | Great Britain | Jan. 24, 1946 |